July 27, 1937.　　　E. J. SCHAEFER　　　2,088,443
THERMAL SWITCH
Filed Sept. 18, 1935
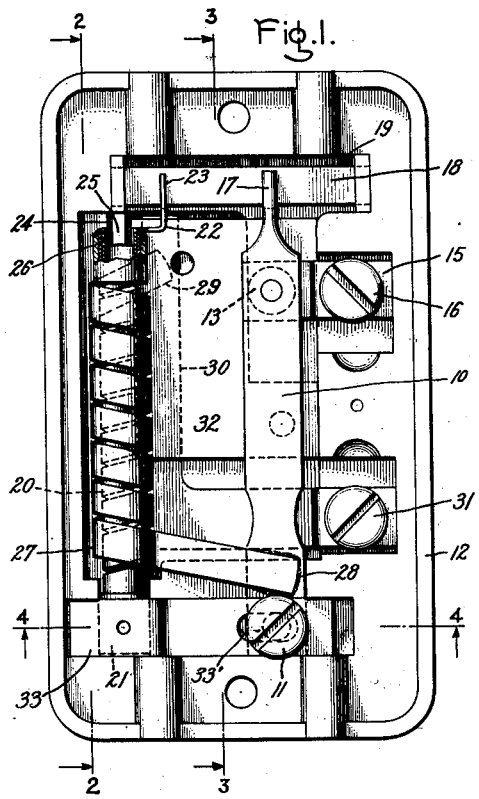
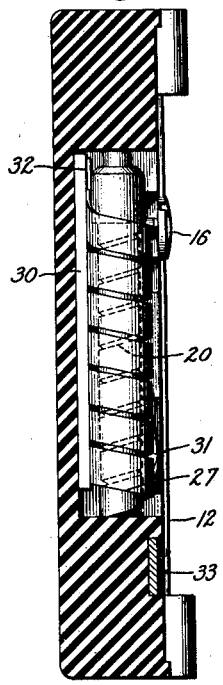
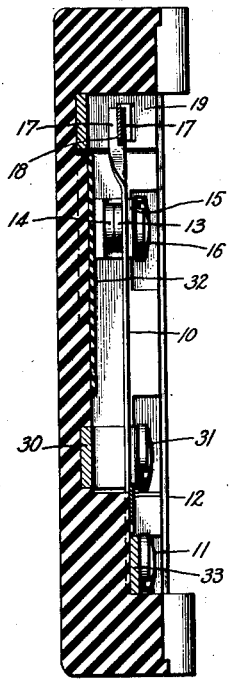
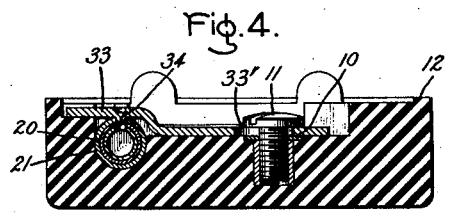
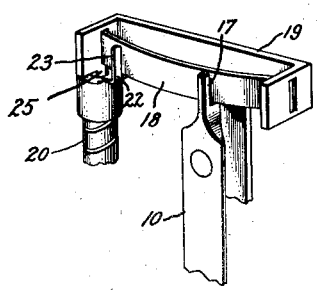
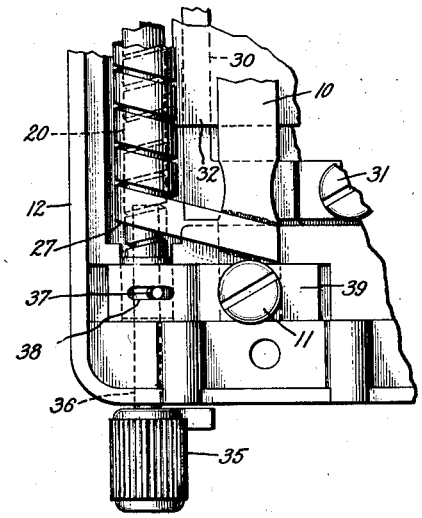
Inventor:
Edward J. Schaefer,
by Harry E. Dunham
His Attorney.

Patented July 27, 1937

2,088,443

UNITED STATES PATENT OFFICE 2,088,443

THERMAL SWITCH

Edward J. Schaefer, Fort Wayne, Ind., assignor to General Electric Company, a corporation of New York Application September 18, 1935, Serial No. 41,059

9 Claims. (Cl. 200—122)

My invention relates to thermal switches, more particularly to overload responsive thermal switches, and has for its object the provision of a simple, reliable and low cost device of this character.

My invention is especially useful in the protection of small electric motors of fractional horsepower size, it being contemplated that the device, for purposes of convenience, will be mounted on the frame of the motor itself, although it may of course be mounted in any convenient location.

In carrying out my invention in one form I provide a bow-shaped snapping spring for controlling the switch contacts together with a bimetallic thermostat shaped in the form of a helix for operating the snapping spring from one position to another. This thermostat is heated in response to the current in the switch or motor circuit by means of a helically shaped resistor surrounding the thermostat. The thermostat may have one end secured to the base and its other end rotatable in response to temperature changes to snap the spring from the closed to the open position and vice versa.

On the other hand, one end of the helical thermostat may be provided with limited freedom of rotation so that the thermostat itself may be rotated bodily by a suitable handle to open and close the circuit under predetermined normal temperature conditions. In such case, the rotation of the thermostat with respect to the base is limited by a stop, however, so that upon a predetermined change in temperature the thermostat operates the snapping member to control the switch contacts.

For a more complete understanding of my invention, reference should be had to the accompanying drawing, Fig. 1 of which is a plan view of a thermal switch embodying my invention; Fig. 2 is a sectional view along the line 2—2 of Fig. 1 looking in the direction of the arrows; Fig. 3 is a sectional view along the line 3—3 of Fig. 1 looking in the direction of the arrows; Fig. 4 is a sectional view along the line 4—4 of Fig. 1 looking in the direction of the arrows; Fig. 5 is a fragmentary view showing the details of the snapping spring and its connections with the thermostat and switch arm, while Fig. 6 is a fragmentary view showing a modified form of my invention provided with a handle or knob for manual operation of the switch contacts.

Referring to the drawing, in one embodiment of my invention, I have shown a flexible metal contact arm 10 preferably made of phosphor bronze material, having one end clamped by a screw 11 to the insulating support or base 12 and carrying near its other end a switch contact 13 co-operating with a similar switch contact 14 carried by a conducting bar 15 which is secured to the base by a screw 16. The free end of the switch arm 10 terminates in a pair of parallel spaced projections 17 which embrace a snapping spring 18 at a point near its middle whereby snapping movement of the spring operates the movable contact 13.

As shown perhaps most clearly in Fig. 5, the snapping spring 18 is mounted between the arms of a U-shaped metal support 19 which is suitably secured in a recess provided for it in the base 12. The spring is a steel strip which is normally straight but is compressed between the arms of the support 19 into a bow shape. The spring thus has two stable positions in one of which, as shown in Fig. 5, the movable contact 13 is in the open circuit, while in the other stable position of opposite curvature, as indicated in Fig. 3, the switch contacts are in engagement. Furthermore, when the spring is moved from one stable position to the other, it operates after initial compression with a snap action to the opposite position, thus operating the switch contacts with a snap movement.

For operating the spring 18, I have provided a bimetallic thermostat 20 which is wound into the shape of a helix, one end 21 being secured to the base, while the other end is free to rotate as the helix uncoils or coils up in response to changes in temperature. This free end has secured rigidly to it an operating arm 22 which is offset or extends laterally with respect to the axis of the thermostat helix. At its end, the arm 22 is bent laterally so as to extend at right angles to the spring 18, this portion being slotted or in other words consisting of two parallel projections 23 which embrace the spring 18 at a point near one end of the spring. It will thus be observed that rotation of the free end of the thermostat through a small angle actuates the arm 22 and through it snaps the spring from one position to the other. To facilitate rotation of this free end an internal bearing 24 is provided for it, this bearing consisting of a sleeve which is mounted rigidly on a projection 25 extending laterally from one arm of the U-shaped support 19. The bearing 24 co-operates with a suitable bearing sleeve 26 secured to the thermostat.

The thermostat is heated by means of a resistor 27 formed from a strip of suitable resistance heating material such as an alloy of nickel and chromium, which strip is formed into a helix having a diameter somewhat larger than the diameter of the thermostat and mounted in a position to surround the thermostat throughout substantially its entire length. This resistor is connected in the electric circuit controlled by the switch contacts 13 and 14. As shown, one end 28 of the resistor is suitably electrically connected, as by welding, to the switch arm 10 while the other end 29 is electrically connected to a conducting strap 30 mounted in the base below the resistor and extending lengthwise and laterally of the base to terminate in a connection screw 31. A sheet 32 of insulating material, such as mica, is placed over the conducting strap 30. The connections for the ends of the resistor serve also to support the resistor.

The circuit through the switch leads from the binding screw 15, for example, through the contacts when the switch is closed, the contact arm to the end 28 of the resistor, and thence through the resistor, the conducting strap 30, and out through the binding screw 31. It is essential that the resistor helix be large enough to assure a slight spacing between it and the inner thermostat helix whereby the two helixes are electrically insulated from each other. Since the two helixes when formed have sufficient rigidity to be amply self-supporting, a relatively small spacing is sufficient. Furthermore, the internal bearing 24 for the free end of the thermostat serves to accurately position the thermostat.

The end 21 of the thermostat which is secured to the base may be adjustable, i. e., rotated slightly to effect a temperature adjustment of the switch. As shown in Fig. 4, for that purpose this end of the thermostat is held in a recess provided for it in the base by means of a clamping strap 33 having a protuberance or pin 34 which fits in an aperture provided for it in the thermostat. The strap 33 is in turn secured by the clamping screw 11. In order to change the temperature adjustment, the screw 11 is loosened and the thermostat turned by sliding the clamping strap 33, an elongated hole 33' being provided in the strap for the clamping screw 11.

The form of my invention shown in Fig. 6 differs from the forms shown in Figs. 1 to 5, inclusive, in the mounting of the helical thermostat on the base. In this form, the thermostat is not rigidly mounted on the base but may be turned bodily through a small arc by an external handle or knob 35 to actuate the spring 18 and thereby manually open or close the switch. As shown, the knob 35 is secured to an operating shaft 36 which is rotatably mounted in the wall of the base, and has its inner end extending for a short distance into the thermostat helix and secured rigidly to it, for example, by brazing or by clamping the two parts together. The operating shaft 36 carries a pin 37 which extends upwardly into a slot 38 provided in a clamping strap 39 which corresponds with the strap 33 of Fig. 4. In this case, however, the strap 39 does not clamp the thermostat rigidly to the base but is sufficiently loose to allow the thermostat to be turned freely by the knob 35 within the limits prescribed by the slot 38.

Thus the pin 37 engaging the end walls of the slot 38 limits the bodily rotational movement of the thermostat to a small arc. This movement is just sufficient to stress the spring 18 and snap it to its opposite position, the stop preventing excessive strains in the thermostat and distortion thereof.

The strap 39 also serves the purpose of securing the thermostat against rotation to enable it to operate the snapping spring in response to changes in temperature. The pin 37 under normal temperature conditions, i. e., with the thermostat at substantially its ambient temperature, occupies a position near the middle of the slot 38 when the switch is either open or closed as indicated in Fig. 6. Assuming that the switch is closed, upon the occurrence of predetermined overload current for which the device is adjusted, the thermostat uncoils, the pin 37 moving toward the right hand end wall of the slot until finally it engages the end wall and then further distortion of the thermostat causes the opposite end to rotate and snap the switch to the open position. The switch must be reclosed by means of the knob 35.

A further advantage of this arrangement arises from the fact that after opening on overload the switch cannot be reclosed by turning the handle 35 until the thermostat has cooled to nearly the ambient temperature. In other words, any movement of the handle to reclose, which must be in a direction to move the pin toward the right hand end of the slot, based on the assumptions previously made, has no effect on the snapping spring until the thermostat has cooled and substantially recoiled itself. A suitable cover is provided for the base, the two parts preferably being molded from a suitable electrically insulating material such as a phenolic condensation product.

While I have shown a particular embodiment of my invention, it will be understood of course that I do not wish to be limited thereto since many modifications may be made, and therefore contemplate by the appended claims to cover any such modifications as fall within the true spirit and scope of my invention.

What I claim as new and desire to secure by Letters Patent of the United States is:

1. A thermal switch comprising a base, an elongated bimetallic thermostat having one end secured to said base, an elongated flexible contact arm having one end secured to said base adjacent said secured end of said thermostat and extending in parallel relation with the thermostat, said thermostat and said contact arm being of substantially the same length, said base being provided with a recess adjacent the movable ends of said thermostat and said contact arm and extending transversely thereto, a normally straight spring, abutments at the ends of said transverse recess between which said spring is supported and compressed into a bow shape, said spring extending across the movable ends of said thermostat and said contact arm, a connection between the movable end of said thermostat and said spring whereby movement of the movable end of said thermostat in response to changes in temperature snaps said spring from one position to another, a connection between the movable end of said contact arm and said spring whereby snapping movement of said spring operates said arm from one position to another, a movable contact secured to said contact arm near its movable end and a contact secured to said base arranged to be engaged by said movable contact in one of the positions of said contact arm.

2. A thermal switch comprising a base, a helically shaped bimetallic thermostat having one end secured to said base, a flexible contact arm having one end secured to said base adjacent said secured end of said thermostat and extending in parallel relation with the thermostat, said thermostat and said contact arm being of substantially the same length, said base being provided with a recess adjacent the movable ends of said thermostat and said contact arm, and extending transversely thereto, a normally straight spring, abutments at the ends of said transverse recess between which said spring is supported and compressed into a bow shape, said spring extending across the movable ends of said thermostat and said contact arm, an operating arm on the movable end of said thermostat, a pair of projections on the end of said arm extending at right angles to said spring and embracing said spring at a point between its ends whereby rotation of the movable end of said thermostat in response to changes in temperature snaps said spring from one position to another, a pair of spaced projections on the movable end of said contact arm embracing said spring between its ends whereby snapping movement of said spring operates said arm from one position to another, a movable contact secured to said contact arm near its movable end, a contact secured to said base arranged to be engaged by said movable contact in one of the positions of said contact arm, a helical heating resistor surrounding said thermostat in spaced relation therewith, a connection between one end of said heater and the secured end of said contact arm, a pair of terminal members secured to said base and electrical connections respectively between said terminal members and said stationary contact and the other end of said heater.

3. A thermal switch comprising an elongated base made of electrically insulating material provided with a longitudinally extending recess at one side and a transversely extending recess at one end, a helically shaped bimetallic thermostat in said longitudinally extending recess, a flexible contact arm, a screw clamping one end of said contact arm to said base, said contact arm extending in parallel relation with said thermostat, said thermostat and said contact arm being of substantially the same length, a clamping strap extending across the fixed ends of said thermostat and said contact arm, said strap having one end secured to said base by said screw and its other end clamping one end of said thermostat to said base, an operating connection between said strap and said thermostat for securing said thermostat against rotation, said strap being slidable on said base by loosening said screw to adjust the angular position of said thermostat, a normally straight spring strip supported between the ends of said transverse recess and compressed thereby into a bow shape, an operating arm on the movable end of said thermostat, projections on the end of said arm extending at right angles to said spring strip and embracing said strip whereby rotation of the movable end of said thermostat upon changes in temperature snaps said spring from one position to another, spaced projections on the movable end of said switch arm embracing said spring strip whereby the switch arm is moved from one position to another by the snapping of said spring strip, a contact carried by the switch arm near its movable end, and a contact secured to the base in position to be engaged by said movable contact in one position of said switch arm.

4. A thermal switch comprising an elastic snapping element, switch contacts operated by said snapping element, a support, a temperature responsive actuating element mounted for bodily movement on said support, a connection between said temperature responsive element and said snapping element, a manually operable means for moving said temperature responsive element on said support to actuate said elastic element under normal temperature conditions, and a stop on said support co-operating with said temperature responsive element to limit said bodily movement of said temperature responsive element to the range of movement required to actuate said elastic element and thereby secure said element for operation of said elastic element by said temperature responsive element in response to a predetermined change in temperature.

5. A thermal switch comprising a support, a snapping spring mounted on said support, a bimetallic thermostat connected to operate said spring, means mounting said thermostat on said support for movement bodily with relation to said support to operate said spring, and a stop on said support cooperating with said thermostat for limiting the movement of said thermostat on said support to the range of movement required to operate said spring to thereby secure said thermostat for actuation of said spring in response to changes in temperature.

6. A thermal switch comprising a support, a flexible switch arm having one end secured to said support and its other end free to move, a pair of spaced abutments on said support, a normally straight spring strip supported between said abutments and compressed thereby into a bow shape, spaced projections on the end of said switch arm embracing said spring to form an operating connection between said spring and said switch arm, a helically shaped bimetallic thermostat, means mounting said thermostat for rotation on said support, a connection between one end of said thermostat and said spring whereby rotation of said end through a predetermined angle snaps said spring from one position to another, a handle connected to the opposite end of said thermostat for rotating said thermostat bodily to snap said spring at normal temperatures and thereby operate said switch arm, a stop on said support cooperating with said thermostat to limit the angular movement of the said last-mentioned end of said thermostat to an amount not substantially greater than said angle to thereby secure said thermostat for actuation of said spring in response to a predetermined change in temperature, said stop preventing subsequent operation of said spring by said handle until after said thermostat has cooled to substantially said normal temperature, and a heating resistor surrounding said thermostat connected in circuit with said switch arm.

7. The combination with a temperature responsive element, of a control device operated thereby, a support, means loosely mounting said temperature responsive element on said support for bodily movement with relation to said support, operating means for moving said temperature responsive element bodily with relation to said support to actuate said control device under predetermined temperature conditions, and stop means on said support for limiting said bodily movement of said temperature responsive element to the range of movement required for actuation of said control device whereby said control device is actuated by distortion of said temperature responsive element in response to a predetermined change in temperature.

8. A thermal switch comprising a resilient snapping element, a control device operated thereby, a temperature responsive element connected to said snapping element, a support, means mounting said temperature responsive element on said support for bodily movement with relation to said support to actuate said snapping element under normal temperature conditions, an operating handle connected to said temperature responsive element for moving said element bodily to actuate said snapping element, and stop means on said base for limiting said bodily movement of said temperature responsive element to the range of movement required to actuate said snapping element under normal temperature conditions and thereby secure said temperature responsive element for actuation of said snapping element by distortion of said temperature responsive element in response to a predetermined change in temperature.

9. A thermal and manually operated switch comprising a temperature responsive element, a control device operated thereby, a support, means mounting said element on said support for limited freedom of movement bodily over a predetermined range on said support, an operating handle connected to said element for moving said element bodily with relation to such support over said predetermined range, said range of movement of said element on said support being such that said control device can be operated at a predetermined temperature by bodily movement of said element by said handle and such that upon distortion of said thermostat in response to a change in temperature said thermostat is secured at one limit of its range of movement for operation of said control device by said thermostat at a different predetermined temperature.

EDWARD J. SCHAEFER.